United States Patent [19]

Younce et al.

[11] Patent Number: 5,274,705
[45] Date of Patent: Dec. 28, 1993

[54] NONLINEAR PROCESSOR FOR AN ECHO CANCELLER AND METHOD

[75] Inventors: Richard C. Younce, South Bend, Ind.; Robert W. Cochran, Lombard, Ill.

[73] Assignee: Tellabs Inc., Lisle, Ill.

[21] Appl. No.: 765,924

[22] Filed: Sep. 24, 1991

[51] Int. Cl.⁵ .............................................. H04M 9/08
[52] U.S. Cl. ................................... 379/410; 379/406; 379/345; 370/32.1
[58] Field of Search ............... 379/406, 410, 411, 345; 370/32.1

[56] References Cited

U.S. PATENT DOCUMENTS

4,577,071 3/1986 Johnston et al. ................... 379/410

Primary Examiner—James L. Dwyer
Assistant Examiner—Paul A. Fournier
Attorney, Agent, or Firm—Juettner Pyle & Lloyd

[57] ABSTRACT

A nonlinear processor for an echo canceller has an adaptive suppression threshold which is a function of an echo estimate signal generated by an adaptive filter. The nonlinear processor also has an adaptive noise transparency threshold which is a function of an estimated level of background noise. The nonlinear processor is in the send path at the near end of a 4-wire circuit, and during far end single talk is activated to pass send path signals that are below the noise transparency threshold level and above the suppression threshold level. The dual adaptive thresholds of the nonlinear processor during far end single talk result in removal of residual echo from the send path while allowing limited levels of actual background noise to remain on the send path to improve the perceived quality of the voice connections to a far end talker/listener.

30 Claims, 5 Drawing Sheets

NONLINEAR PROCESSOR FOR AN ECHO CANCELLER AND METHOD

BACKGROUND OF THE INVENTION

The present invention relates to nonlinear processors, and in particular to an improved nonlinear processor for an echo canceller.

In a telephone network, 4-wire and 2-wire segments are joined at opposite ends of the network by hybrid circuits, often called 4:2 hybrids. Impedance mismatch in a hybrid circuit causes a 4-wire receive path signal to be reflected onto the 4-wire send path. If there is enough delay in the network, this reflected signal presents itself as echo to the speaker who originated it at the far end, and echo becomes more objectionable as both its level and delay are increased. Echo is one of the primary factors affecting the perceived quality of voice connections. Adaptive echo cancelers remove echo signals from a 4-wire end path.

Echo canceller applications have usually been associated with satellite or long terrestrial transmission paths, which introduce significant signal transmission delays. However, signal processing delays through new digital network elements, such as through the speech coding circuits for digitial cellular systems, are becoming a significant source of transmission delays and, therefore, of new echo canceller applications.

The continuing evolution of the worldwide telecommunications network from analog to digital transmission affects the performance expectations for echo cancelers. Digital facilities provide transmission quality that is relatively noise free. Such clean transmission, however, makes even minute impairments noticeable and potentially objectionable. Very low levels of residual echo, which previously went unnoticed, are now detectable and frequently found annoying. Callers who are often connected over low-noise, echo free digital facilities adjust their expectations, such that connections which were considered good several years ago may be rated poor today. Overall, the telecommunications network evolution and customer expectations are requiring expanded deployment of higher performance echo control devices.

Echo cancellers generally use an adaptive transversal filter structure capable of modeling a linear impulse response for an end path. Low level nonlinear distortion in the end path cannot be properly modeled and degrades echo canceller performance. This limits the echo canceller from removing all perceived echo from the circuit. For this reason, echo cancellers commonly employ a nonlinear processor (NLP), and after reasonable levels of cancellation are achieved, the characteristics of the NLP largely determine the perceived quality of the echo canceller performance. This is especially true in applications where the send out signal from the near end echo canceller is transmitted to the far end over low noise digital facilities.

Caller expectations regarding NLP characteristics have evolved considerably since wide deployment of echo cancellers began. Initially, callers familiar with echo suppressor characteristics were mainly concerned that the deficiencies of echo suppressors be adequately overcome by echo cancellers. These deficiencies involved the problems during double talk of either clipping the near end speech or passing excessive echo. As long as the double talk performance of an echo canceller was adequate, the single talk performance was expected to be at least as good as with an echo suppressor. Echo cancellers with a center clipper NLP transfer function generally met these expectations. For inputs below a suppression threshold, there was no output from the NLP. For inputs above the suppression threshold, the output equaled the input, with some distortion. The suppression threshold was generally adaptive and was designed to adjust to a level slightly above the expected residual echo level.

The center clipper NLP has a characteristic that some callers find objectionable. A "noise modulation" event occurs when the background noise from the near end facility is suppressed in response to far end speech during far end single talk. Because the background signal was primarily Gaussian noise, a "noise matching" feature was added to some echo cancellers to mask this phenomenon. A noise matching feature as applied to an echo canceller NLP operates in such a manner that a near end background noise level is estimated on the send in port. Pseudo-random noise at approximately the estimated background noise level is then injected onto the send out port to the far end whenever the NLP is activated. In the evolving telecommunications networks of late, however, noisy analog and FDM carrier systems in the near end circuits are rapidly giving way to digital optical fiber and circuits with low idle channel noise. In this environment, the background signals modulated by the NLP usually consist of environmental sounds such as people talking, a computer printer, music, etc. In these cases, replacing the background sounds with pseudorandom noise is nearly as obtrusive as inserting silence. To be as unobtrusive as possible, an NLP needs to match not only the near end background noise levels, but also their statistical properties and spectral content. Noise matching cannot achieve this.

OBJECTS OF THE INVENTION

An object of the invention is to provide an improved nonlinear processor (NLP) for an echo canceller, which utilizes dual adaptive thresholds to minimize distortion of near end speech and to make operation of the NLP less obtrusive.

Another object is to provide such an NLP that utilizes an adaptive suppression threshold which is a function of an echo estimate signal.

A further object is to provide such an NLP that utilizes an adaptive noise transparency threshold which is a function of an estimated level of background noise.

SUMMARY OF THE INVENTION

In accordance with one aspect of the present invention, there is provided an improved nonlinear processor (NLP) for an echo canceller that couples to first and second paths of a telecommunications network and generates a signal $\hat{y}[n]$ that is an estimate of an echo signal that occurs on the first path in response to a signal on the second path and that is subtracted from a signal on the first path to leave on the first path a residual signal $e[n]$. The NLP has an NLP threshold and couples to the first path to receive the residual signal $e[n]$ at an input thereto and to generate at an output therefrom and on the first path a send out signal $e_{out}[n]$ that is related to the residual signal $e[n]$ by a threshold transfer function of the NLP. The improvement is characterized by means for controlling the NLP threshold to be a function of the echo estimate signal $\hat{y}[n]$, so that the transfer function also is a function of the echo estimate signal $\hat{y}[n]$.

This particular aspect of the invention also contemplates an improved method of operating the NLP, which comprises the steps of generating with the NLP a send out signal $e_{out}[n]$ that is related to the residual signal $e[n]$ by a threshold transfer function of the NLP and controlling the NLP threshold to be a function of the echo estimate signal $\hat{y}[n]$, so that the threshold transfer function also is a function of the echo estimate signal $\hat{y}[n]$.

According to another aspect of the invention, an improved NLP for an echo canceller is characterized by means responsive to residual signal $e[n]$ levels that are below a noise transparency (NT) threshold to generate on the first path, on the output side of said NLP, a signal in accordance with such residual signal $e[n]$ levels and in which the spectral content of such residual signal levels is generally maintained.

Also contemplated is an improved method of operating the NLP according to the second aspect of the invention. The method comprises the steps of generating a send out signal $e_{out}[n]$ that is related to the residual signal $e[n]$ by a threshold transfer function that is in accordance with an NLP threshold of the NLP, and also providing on the first path, on the output side of the NLP, a signal in accordance with residual signal $e[n]$ levels that are below the NT threshold and in which the spectral content of such residual signal levels is generally maintained.

The foregoing and other objects, advantages and features of the invention will become apparent upon a consideration of the following detailed description, when taken in conjunction with the accompanying drawings.

DETAILED DESCRIPTION

Figure 1:
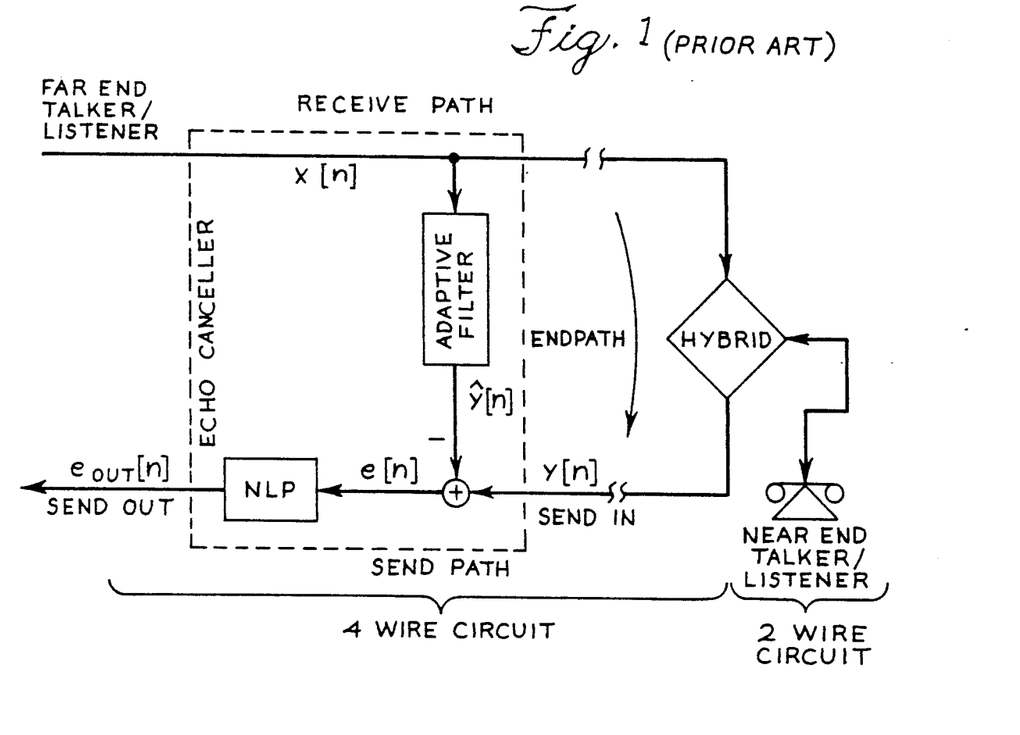
FIG. 1 is a schematic representation of a conventional echo canceller that includes a nonlinear processor (NLP)

FIG. 1 shows a conventional echo canceller residing at one end, i.e., a near end, of a 4-wire circuit of a telecommunications network. A receive path carries a far end speech signal $x[n]$ to the near end and a send path carriers a near end speech signal $e_{out}[n]$ to the far end. A hybrid circuit interfaces between the 4-wire circuit and a 2-wire circuit. An imperfect hybrid balance causes some of a far end talker's speech signal to be reflected onto the send path and, if unimpeded, to be returned to the far end talker as echo. The purpose of the echo canceller is to remove from the send path the echo signal resulting from the far end talker's speech.

The echo canceller operates in a well known manner to remove echo from the send path by subtracting from a send in signal $\hat{y}[n]$ an echo estimate signal $y[n]$ generated by an adaptive filter. The echo estimate signal is generated by convolving an estimate of an impulse response of the end path with the receive path signal $x[n]$. The adaptive filter develops the estimate of the impulse response from the receive path and send path signals, usually by using the well known Least Mean Squares method. The echo canceller can remove from the send path up to 36 dB of the echo signal.

Although 36 dB attenuation is substantial, it is not enough to remove all perception of echo by the far end talker. The 36 dB performance limitation of the echo canceller is due primarily to nonlinear effects of quantization. As a result of the limitations of the echo estimation process, a nonlinear subsystem is employed to further remove echo, which subsystem commonly is called a nonlinear processor (NLP). The purpose of the NLP is to remove any residual echo that remains in the send path signal $e[n]$ after the echo estimate signal $\hat{y}[n]$ is subtracted from the send in signal $y[n]$, ideally while not interfering with near end speech signals.

Figure 2:
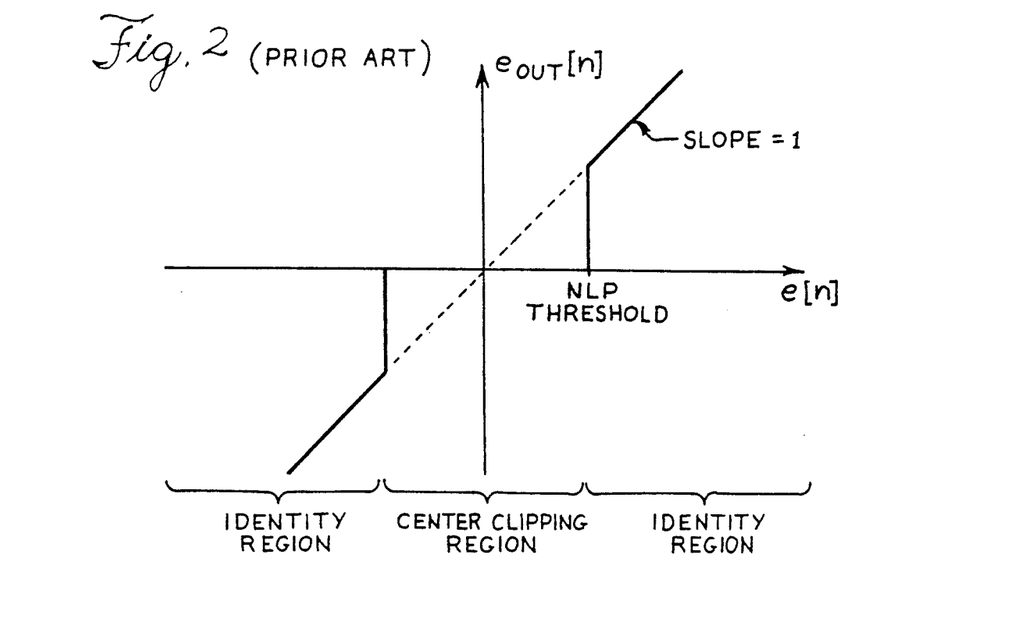
FIG. 2 shows a transfer function of a conventional NLP.

As seen in FIG. 1, the NLP receives the output signal $e[n]$ from the echo estimate subtraction process and outputs a send out signal $e_{out}[n]$. The transfer function of the NLP that relates the signals $e[n]$ and $e_{out}[n]$ is usually a simple, memoryless, nonlinear function, an example of which is shown in FIG. 2. This transfer function, when the NLP is active, reduces small $e[n]$ signals to zero on $e_{out}[n]$, i.e., $e_{out}[n]=0$ if $e[n]<$NLP threshold, while large $e[n]$ signals result in an $e_{out}[n]$ signal that is equal to the $e[n]$ signal, i.e., $e_{out}[n]=e[n]$ for $e[n]>$NLP threshold. The transfer function has the effect of a center clipper, i.e., it clips out small value signals in the center of the range of the $e[n]$ signals, but has no effect on large value $e[n]$ signals. The residual echo signal usually has a small value because of the large echo attenuation provided by the adaptive filter, and normally falls within the center clipping region of the NLP and is thereby removed from the send out signal $e_{out}[n]$.

Within the identity region shown in FIG. 2, larger value $e[n]$ signals are passed through the NLP undisturbed. Large speech signals of the near end talker therefore pass undistorted to the far end. Disadvantageously, if the NLP is active when the near end talker speaks, the small levels of the near end speech signal will be suppressed, resulting in center clipped and distorted near end speech. It is therefore desirable that the NLP be active only when the far end talker is the only one talking, i.e., only during far end single talk. The NLP is not needed when the near end talker is the only one talking, i.e., during near end single talk, because there is then no signal on the receive path and therefore no reflected echo on the send path that requires canceling, and if the NLP remained active during this time, it would distort the near end speech signal. Also, the NLP is not required when both the near end and the far end talkers are speaking at the same time, i.e., during double talk, since the residual echo is then masked by near end speech.

There are two primary design objectives for the NLP. The first is to remove all audible residual echo signals from the send out signal $e_{out}[n]$. The second is to minimize distortion of near end speech signals. It is difficult to satisfy both objectives.

The NLP is controlled by the NLP threshold. During far end speech, the NLP threshold should be set just high enough to remove the residual echo signal and no higher, because too high a setting can cause unnecessary near end speech distortion. During near end single talk the NLP threshold should be set to zero, effectively removing the NLP from the send path so as not to distort the near end speech. Also during double talk, when the near end speech masks the residual echo, the NLP threshold should again be set to zero so as not to distort the near end speech.

Figure 3:
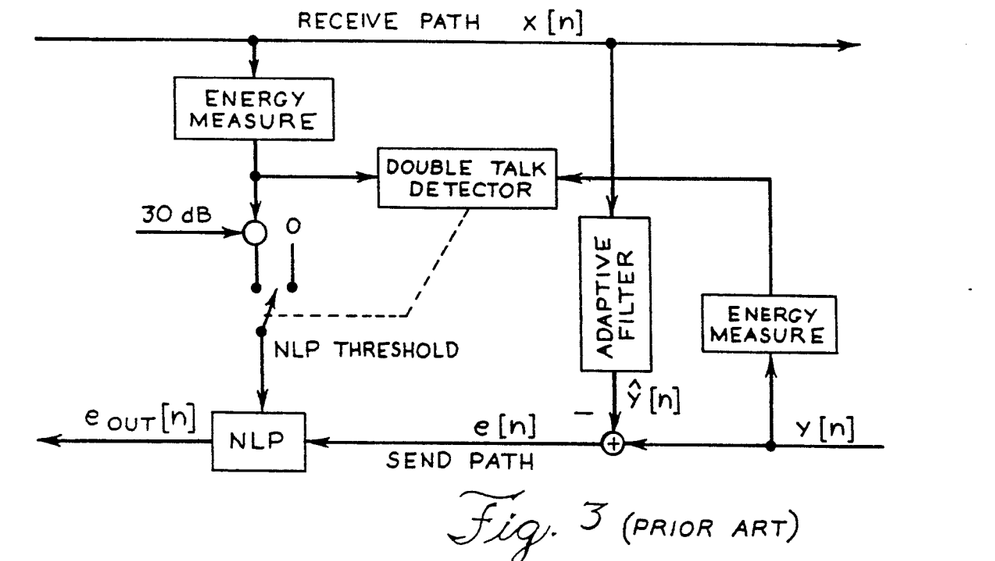
FIG. 3 illustrates a type of prior art NLP control in which an NLP threshold level is a function of a receive path signal and a double talk detector signal.

A previously known NLP control scheme is shown in FIG. 3. Here the level of the NLP threshold is based upon the energy of the receive path signal x[n] as applied to a threshold control port of the NLP and a double talk detector signal, for example as taught by U.S. Pat. No. 3,894,200. If the double talk detector indicates double talk, which includes near end single talk, the NLP threshold is set to zero. If there is no double talk, the NLP threshold is set 30 dB below the receive path signal energy level. For example, if the receive path signal is a −10 dBm0 signal, the NLP threshold is set to suppress send path signals e[n] with energy levels below −40 dBm0. The 30 dB differential between the receive path signal energy and the residual echo signal energy is based upon the assumption that the end path will attenuate the echo signal by at least 6 dB and that the echo estimate signal y[n] will cause removal of at least another 24 dB from the echo signal y[n]. Thus, the energy level of the residual echo signal e[n] should be at least 30 dB below the receive path signal energy level.

Figure 4:
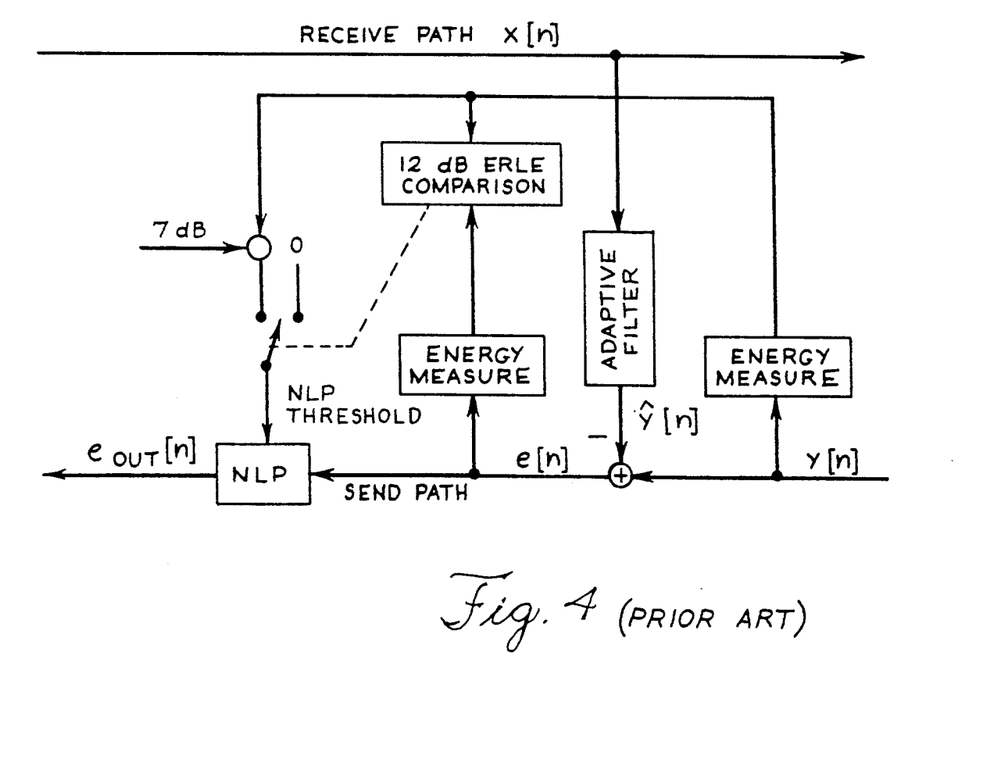
FIG. 4 illustrates another type of prior art NLP control in which the NLP threshold level is based upon send in signal energy and a measured quantity known as echo return loss enhancement.

Another previously known scheme for controlling the NLP threshold is taught by U.S. Pat. No. 4,679,230 and is generally shown in FIG. 4. According to this technique, the NLP threshold is based upon the energy level of the send in signal y[n] and a measured quantity known as the echo return loss enhancement (ERLE). The ERLE is a measure of the ratio of two signal energies and is usually expressed in dB. The ERLE is defined by $$ERLE = 10\log_{10}\left(\frac{y[n]\text{energy}}{e[n]\text{energy}}\right)$$

When far end single talk occurs, the echo estimator (adaptive filter and substractor) can remove up to 36 dB of echo energy, and in this case the ERLE should be on the order of 36 dB. When near end single talk occurs, the echo estimator does not remove anything from the send in signal and in this case the ERLE is on the order of 0 dB. Therefore, a large ERLE measure is an indication of far end single talk when the NLP should be activated and a small ERLE is an indication of the presence of near end speech or of double talk when the NLP threshold should be zero. It is known to set the NLP threshold to zero whenever the ERLE is less than 12 dB. If the ERLE is greater than 12 dB, indicating a far end single talk situation, the NLP threshold is set to a level approximately 7 dB down from the y[n] signal energy level.

Selecting the NLP threshold based upon the send in signal y[n] overcomes certain disadvantages of a receive path signal based NLP threshold. First, a receive path signal based NLP threshold assumes some attenuation in the hybrid. Usually, a worst case assumption of 6 dB is used, but if the actual hybrid loss is greater than 6 dB, then a smaller NLP threshold can be used, resulting in less distortion of the near end speech signal. With a send in signal based NLP threshold, the send in signal y[n] is attenuated by the hybrid.

Another shortcoming of a receive path signal energy based NLP threshold is one of timing. An echo canceller usually is provisioned to remove echoes with delays on the order of 32 to 64 milliseconds. When a burst of speech appears on the receive path, the echo signal resulting from it can present itself on the send path anywhere from 0 to 64 milliseconds later. If the NLP threshold is based solely on the receive path signal energy, the NLP must be kept active for the entire 64 milliseconds, because the echo can occur anytime during that period. In consequence, the NLP is active at times when it is not needed, which results in increased distortion of near end speech signals. It is desirable that the NLP be active only when echo is present on the send path. An NLP threshold based upon send in signal y[n] energy somewhat accomplishes this by activating the NLP only when there is a send in signal.

A further disadvantage of a receive path signal energy based NLP threshold is that it has no mechanism, other than a simple double talk detector, to detect the presence of near end speech and prevent activation of the NLP. This problem is mitigated somewhat by a double talk detection technique based upon an ERLE threshold comparison, but for low levels of near end speech or because of delays in the ERLE measurement circuit, distortion of near end speech signals can nevertheless occur.

The Invention

Figure 5:
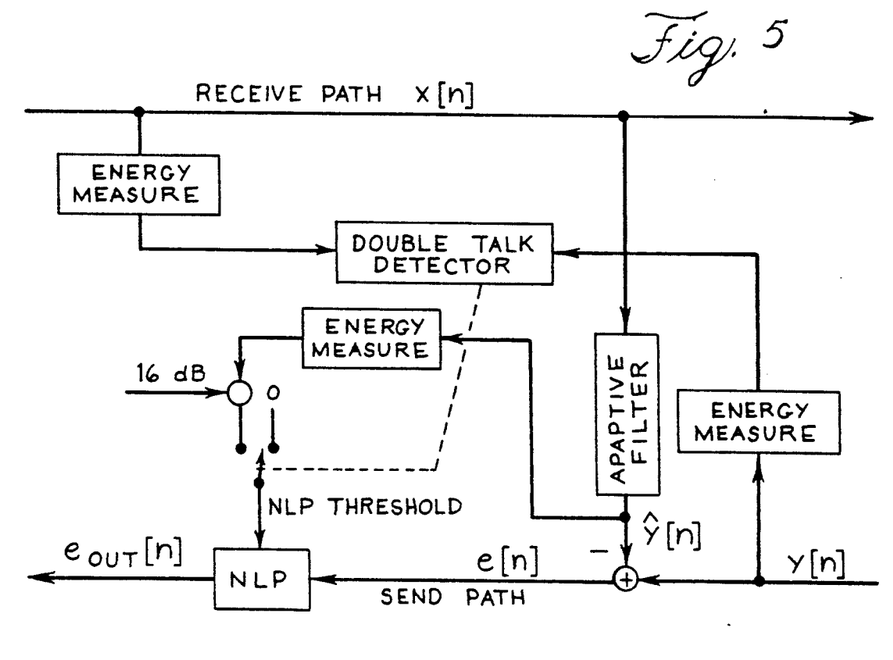
FIG. 5 is a schematic representation of an echo canceller having an NLP according to the present invention, in which the NLP uses an adaptive NLP threshold level that is a function of an echo estimate signal generated by an adaptive filter.

The invention provides an improved technique for establishing an NLP threshold, sometimes called an NLP suppression threshold, for an NLP of an echo canceller. This is accomplished by basing NLP threshold level upon a more accurate level of the residual echo signal, thereby to minimize distortion of near end speech signals. Unlike that which is contemplated by the prior art, the NLP threshold level is not based upon either the receive path signal x[n] or upon the send path signal y[n]. Instead, it is a function of the energy of the echo estimate signal ŷ[n], as seen in FIG. 5. Listening tests have placed the NLP threshold 16 dB down from the echo estimate signal energy level. For example, if the echo estimate signal ŷ[n] has an energy of −20 dBm, the NLP threshold is set to attenuate signals below −36 dBm.

The NLP threshold is adjusted to a level just above the expected residual echo signal level by virtue of being based upon and having a level in accordance with the energy level of the calculated echo estimate signal ŷ[n]. The NLP therefore has an adaptive NLP threshold which activates the NLP only when a reasonable level of cancellation is occurring. Thus, the converged echo canceller is used to correlate activation of the NLP with the timing of residual echo signals which must be processed by the echo canceller.

Providing the NLP with an adaptive suppression threshold which is a function of the calculated echo estimate signal y[n], overcomes a problem associated with using a send in signal y[n] energy based NLP threshold. In particular, the technique distinguishes between the energy of an echo signal and the energy of a near end speech signal on the send in path, since the echo estimate signal energy reflects only the energy of the anticipated echo signal. The NLP suppression threshold is therefore unaffected by near end speech signals, which results in less near end speech distortion.

The invention also has advantages over a receive signal x[n] energy based NLP threshold. First, energy losses in the hybrid are automatically compensated for, since if the hybrid has high loss, the energy of the echo estimate will be small and the associated NLP threshold level will be small. Secondly, there is no timing problem involved, since the NLP is active only when echo is present on the send path. This occurs because the echo estimate signal has the same delay as the echo signal through the end path. The echo estimate signal will therefore appear on the send side of the canceller at the same time as the echo signal, and the NLP will not be activated to insert the suppression threshold unless echo is present.

Figure 6:
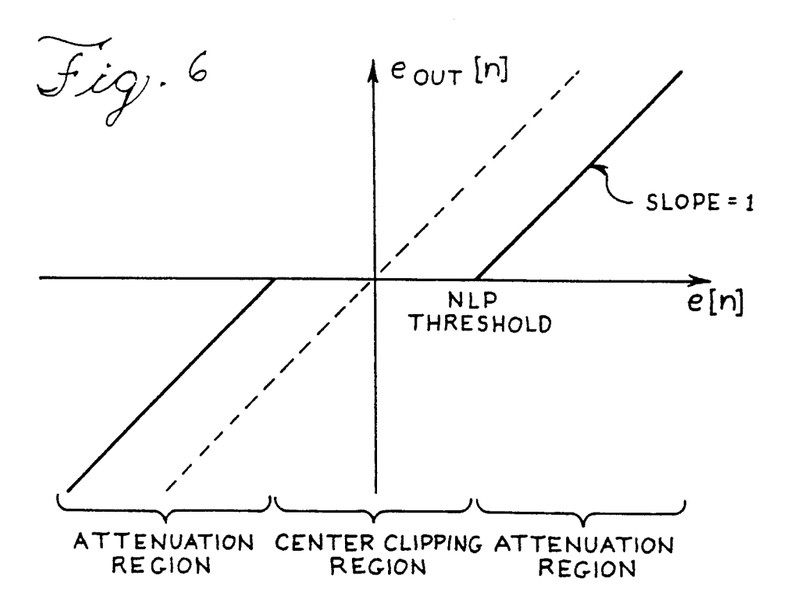
FIG. 6 illustrates a transfer function of the NLP shown in FIG. 5.

The transfer function of the NLP that relates e[n] to $e_{out}[n]$ is shown in FIG. 6. The center clipping region of this transfer function is the same as in the transfer function shown in FIG. 2. The transfer function differs, however, in that large signals do not pass over the send path unaffected by the NLP. Large signals are attenuated by the NLP, which decreases the discontinuity at the NLP threshold. For example, where low level near end speech signals or background noise signals occasionally exceed the NLP threshold, with the NLP transfer function of FIG. 2, send path signals that exceed the threshold will pass through the NLP unaffected and result in large amplitude signals being sent to the far end because of the large discontinuity in the transfer function at the NLP threshold. However, the same signals when passed through an NLP with a transfer function as shown in FIG. 6 will have a smaller amplitude. This "smoother" transfer function results in a more continuous treatment of background noises and/or low level speech. The transfer function is defined by $$e_{out}[n] = 0 \text{ for } e[n] < NLP \text{ threshold}$$

and $$e_{out}[n] = e[n] - NLP \text{ threshold for } e[n] \geq NLP \text{ threshold.}$$

As seen in FIG. 5, the double talk detector is connected to control the NLP threshold level to be either zero or a a level 16 dB down from the energy level of the echo estimate signal y[n]. In one selectable mode of operation of the NLP, the double talk detector places the NLP in an active state during far end single talk, at which time the NLP threshold is at a level 16 dB down from the energy level of the echo estimate signal y[n], and in an inactive state during either double talk or near end single talk, at which time the NLP threshold is set to zero so that the NLP is transparent to send path signals. In another selectable mode of operation, the NLP threshold is not controlled by the double talk detector, but instead is set to always be 16 dB down from the energy level of the echo estimate signal. In this case, during far end single talk the NLP is active and its NLP threshold level is 16 dB down from the echo estimate signal energy level. During double talk and near end single talk, however, the NLP is not completely transparent to send path signals, but nevertheless is considered to be "inactive" since the echo estimate signal is then zero and the NLP theshold level of 16 dB does not result in sufficient suppression of the center portions of send path signals to be discernable to a far end listener.

The Prior Art

Figure 7:
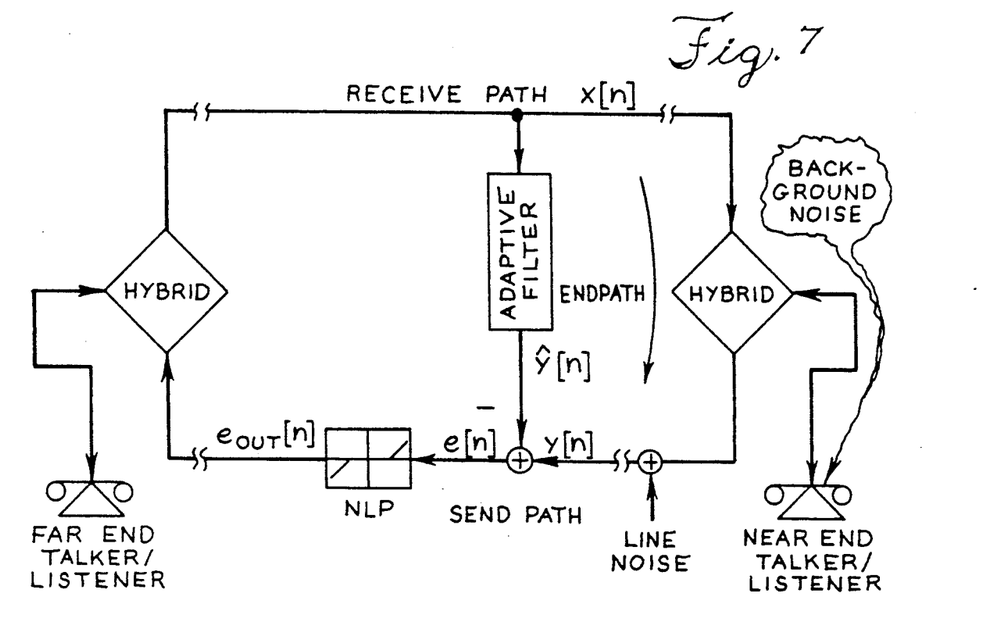
FIG. 7 is a simplified schematic representation of an echo canceller having an NLP according to the invention, showing the addition of background and line noise to the end path.

When the NLP is active during far end single talk, the send out signal $e_{out}[n]$ will be zero and the far end talker will hear silence as long as the send path back to the far end talker is relatively noise free. However, the send path often is not noise free. As illustrated in FIG. 7, line noise and/or low level background noise frequently occurs in the end path. When the far end talker is speaking, he will hear silence on his handset because the line/background noise is suppressed or zeroed by the NLP. However, when the far end talker stops speaking, the NLP is deactivated and he will hear line/background noise. This annoying phenomenon is known as noise modulation because the far end talker hears a noise source modulated by his speech.

Figure 8:
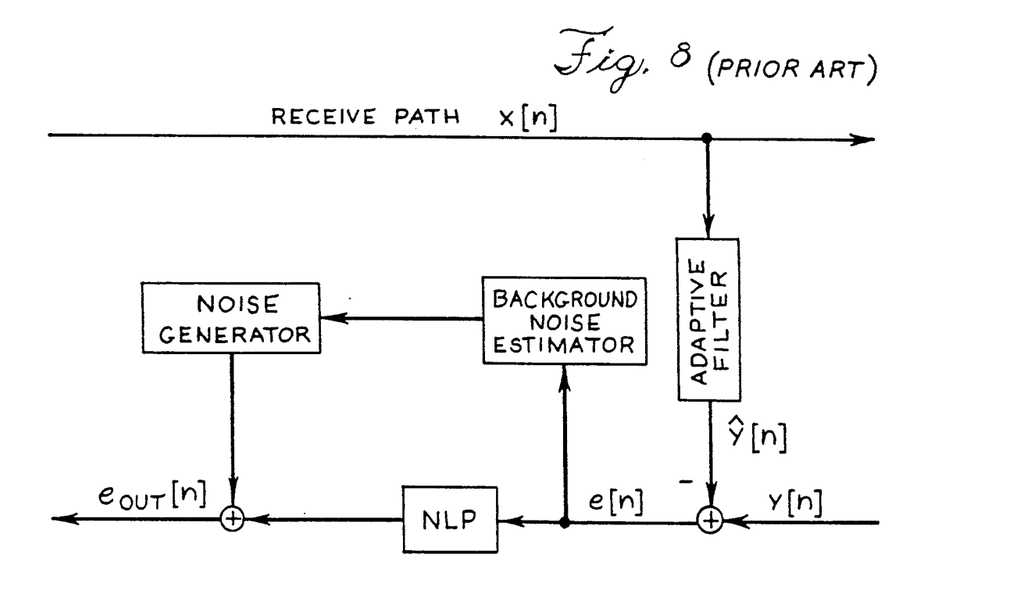
FIG. 8 is a schematic representation of a conventional noise matching system.

Noise matching is a technique that has been used in an attempt to solve the noise modulation problem, for example as taught by U.S. Pat. No. 4,645,883. Noise matching injects a simulated noise signal onto the send out path during far end single talk when the NLP is active, so that the far end talker hears a consistent level of noise during the call. When the far end talker is silent, the NLP is inactive and he hears the real line noise. In order to match the simulated noise level to the actual noise level, an estimate of the noise signal level must be developed. FIG. 8 shows a known noise matching system consisting of a background noise estimator and a noise generator. The background noise estimator develops and outputs an estimate of the noise signal level that is used by the noise generator to set the level of matched noise introduced by the noise generator onto the send out path.

A problem with noise matching is that it matches all background noise types, irrespective of their spectral content, with an internally generated noise that is usually white. This method is fine if the background noise is electric noise on the lines, but provides a poor match for other background noises, such as those from a computer printer or impulsive noise.

The Invention

Figure 9:
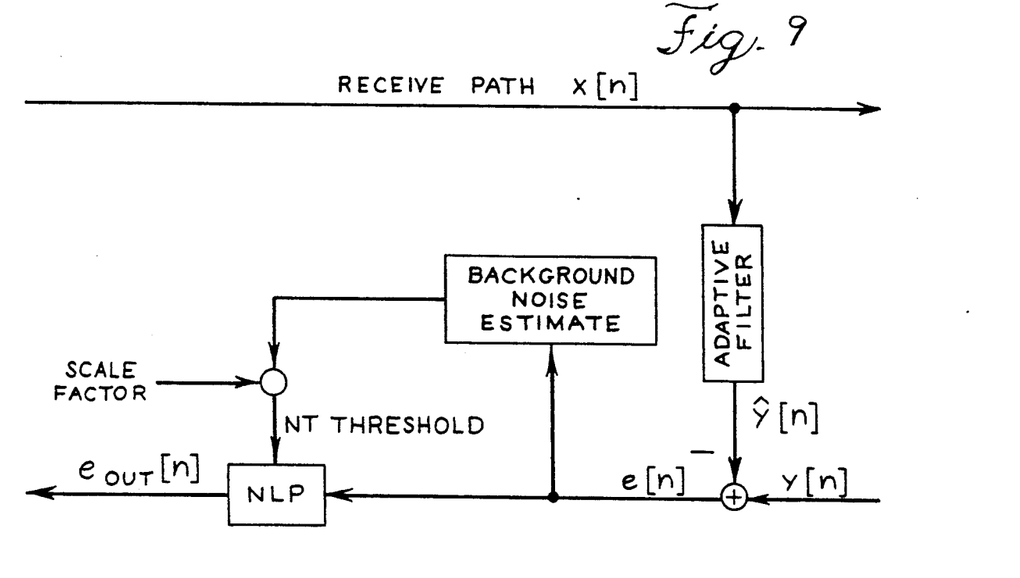
FIG. 9 is a simplified schematic representation of the NLP of the invention, in which the NLP is also provided with an adaptive noise transparency threshold.

To overcome the disadvantages of conventional noise matching techniques, as seen in FIG. 9 the invention also provides an NLP control scheme that may be termed "noise transparency" (NT). In implementing this scheme, instead of injecting an independently generated white noise source onto the send out path, low levels of the send path signal e[n] are allowed to pass through the NLP without affecting the spectral content of the low level signals. The low signal levels that are allowed to pass are below an estimated background noise level. The NT scheme therefore utilizes a background noise level estimator but not a noise generator.

Figure 10:
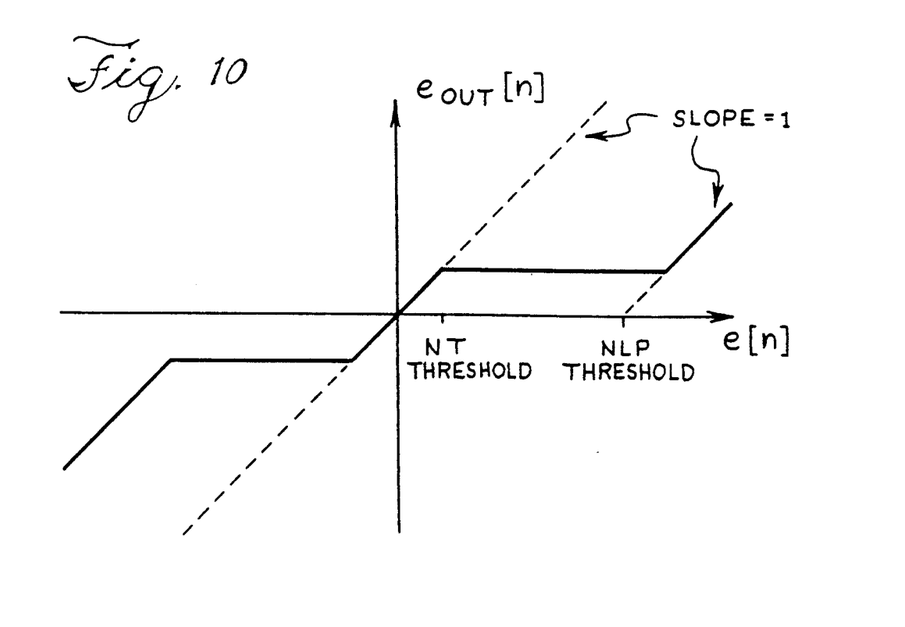
FIG. 10 shows the dual threshold transfer function of the NLP of the invention.

Either the send path signal y[n] or, as shown, the send path signal e[n], is applied to the background noise estimator circuit, which generates a background noise energy level estimate that is multiplied by a scale factor, e.g., by 0.77, to produce an adaptive NT threshold level. The NT threshold is applied to the NLP to modify the center clipping region of the NLP transfer function, as shown in FIG. 10. As is seen from this dual adaptive threshold transfer function, small send path e[n] signals (those below the NT threshold) are allowed to pass through the NLP unaffected while signals having a level between the NT threshold and the NLP threshold are limited in level to the NT threshold level. When the NT threshold level exceeds the NLP threshold level, as may happen in the absence of or in response to relatively low energy level far end signals, the NLP threshold is set to zero to make the NLP transparent to send path signals, just as occurs in response to near end speech.

The purpose of the NT technique is to adjust the NT threshold so as to allow low levels of actual background noise to pass through the NLP without distortion and while maintaining the spectral content of the background noise signals, and at the same time to prevent residual echo signals from being transmitted to the far end talker. What happens in practice is that whatever background noise is allowed to pass through the NLP masks the residual echo.

In summary, the NLP for an echo canceller is implemented through use of a dual adaptive threshold transfer function, as shown in FIG. 10. The NLP is effectively transparent to send path signals below the NT threshold level. Residual echo signals above the NT threshold, but below the NLP threshold, are limited to the NT threshold level, and the NLP threshold is adjusted to a level just above the expected residual echo level. The dual adaptive threshold transfer function is therefore defined by:

$e_{out}[n] = e[n]$ for $e[n] < NT$ threshold $e_{out}[n] = NT$ threshold for $NT$ threshold $\leq e[n] < NLP$ threshold $+ NT$ threshold $e_{out}[n] = e[n] - NLP$ threshold for $e[n] \geq NLP$ threshold $+ NT$ threshold.

The invention therefore provides an improved NLP for an echo canceller. The NLP has an adaptive NLP threshold, the level of which is a function of the energy of the calculated echo estimate signal, which advantageously provides for activation of the NLP only when an echo signal is actually present on the send path and results in a reduction in distortion of near end speech signals. The NLP also has an adaptive NT threshold, the level of which is a function of the energy level of estimated background noise, which advantageously enables the NLP to pass to the far end actual low level background noises.

While embodiments of the invention have been described in detail, various modifications and other embodiments thereof may be devised by one skilled in the art without departing from the spirit and scope of the invention, as defined in the appended claims.

What is claimed is:

1. An improved nonlinear processor (NLP) connected to an echo canceller that couples to first and second paths of a telecommunications network and generates a signal y[n] that is an estimate of an echo signal that occurs on the first path in response to a signal on the second path and that is subtracted from a signal on the first path to leave on the first path a residual signal e[n], wherein said NLP has an NLP threshold and couples to the first path to receive the residual signal e[n] at an input thereto and to generate at an output therefrom and on the first path a send out signal $e_{out}[n]$ that is related to the residual signal e[n] by a threshold transfer function of said NLP, and wherein the improvement is characterized by means for controlling said NLP threshold to be a function of the echo estimate signal y[n], so that said threshold transfer function also is a function of the echo estimate signal y[n]; means for providing said NLP with a noise transparency (NT) threshold; means for controlling said NT threshold to be a function of a background noise signal portion of the first path signal on the input side of said NLP; and means for generating on the first path, on the output side of said NLP, a signal in accordance with residual signal e[n] levels that are below said NT threshold and in which the spectral content of such residual signal levels is generally maintained, said NT threshold being lower than said NLP threshold.

2. An improved NLP as in claim 1, wherein said means for controlling said NLP threshold includes means for measuring the energy level of the echo estimate signal y[n] and for controlling said NLP threshold to have a level that is a function of the echo estimate signal y[n] energy level.

3. An improved NLP as in claim 2, wherein said controlling means controls said NLP threshold to have a level that is a function of the echo estimate signal y[n] energy level plus a constant energy level selected so that said NLP threshold is above the energy level of an expected residual echo signal portion of the residual signal e[n].

4. An improved NLP as in claim 1, wherein said threshold transfer function is such that the send out signal $e_{out}[n]$ is related to the residual signal e[n] by a first transfer function for levels of the residual signal e[n] that are less than said NLP threshold and by a second transfer function for levels of the residual signal e[n] that are equal to or greater than said NLP threshold.

5. An improved NLP as in claim 4, wherein said first and second transfer functions are such that $e_{out}[n] = 0$ for $e[n] < NLP$ threshold and $e_{out}[n] = e[n] - NLP$ threshold for $e[n] \geq NPL$ threshold.

6. An improved NLP as in claim 1, wherein said means for generating includes means for controlling said NLP to be essentially transparent to residual signal e[n] levels that are below said NT threshold, so that such residual signal levels appearing on the first path at said NLP input are presented, generally without change in the spectral content thereof, at said NLP output.

7. An improved NLP as in claim 1, wherein said NLP threshold transfer function is defined by $e_{out}[n] = e[n]$ for $e[n] < NT$ threshold $e_{out}[n] = NT$ threshold for $NT$ threshold $\leq e[n] < NLP$ threshold $+ NT$ threshold and $e_{out}[n] = e[n] - NLP$ threshold for $e[n] \geq NLP$ threshold $+ NT$ threshold.

8. An improved nonlinear processor (NLP) connected to an echo canceller that couples to first and second paths of a telecommunications network and generates a signal $\hat{y}[n]$ that is an estimate of an echo signal that appears on the first path in response to a signal on the second path and that is subtracted from a signal on the first path to leave on the first path a residual signal e[n], wherein said NLP has an NLP threshold and couples to the first path to receive the residual signal e[n] at an input thereto and to generate at an output therefrom and on the first path a send out signal $e_{out}[n]$ that is related to the residual signal e[n] by a threshold transfer function of said NLP, and wherein the improvement is characterized by means for providing said NLP with a noise transparency (NT) threshold; means for controlling said NT threshold to be a function of a background noise signal portion of the first path signal on the input side of said NLP; and means for generating on the first path, on the output side of said NLP, a signal in accordance with residual signal e[n] levels that are below said NT threshold and in which the spectral content of such residual signal levels is generally maintained, said NT threshold being lower than said NLP threshold.

9. An improved NLP as in claim 8, wherein said means for generating includes means for controlling said NLP to be essentially transparent to residual signal e[n] levels that are below said NT threshold, so that such residual signal levels appearing on the first path at said NLP input are presented, generally without change in the spectral content thereof, at said NLP output.

10. An improved NLP as in claim 8, wherein said NLP send out signal $e_{out}[n]$ is related to the residual signal e[n] by a first transfer function for residual signal e[n] levels that are below said NT threshold, by a second transfer function for residual signal e[n] levels that are equal to or greater than said NT threshold and less than said NLP threshold plus said NT threshold, and by a third transfer function for residual signal e[n] levels that are equal to or greater than said NLP threshold plus said NT threshold.

11. An improved NLP as in claim 10, wherein said first, second and third transfer functions are defined by $e_{out}[n] = e[n]$ for $e[n] < NT$ threshold $e_{out}[n] = NT$ threshold for NT threshold $\leq e[n] < NLP$ threshold $+ NT$ threshold and $e_{out}[n] = e[n] - NLP$ threshold for $e[n] \geq NLP$ threshold $+ NT$ threshold.

12. An improved NLP as in claim 8, wherein said means for controlling said NT threshold comprises means for estimating the energy level of a background noise signal portion of the residual signal e[n] and for controlling said NT threshold to have a level in accordance with the estimated energy level of the background noise signal portion.

13. An improved NLP as in claim 8, wherein the improvement is further characterized by means for controlling said NLP threshold to have a level that is a function of the echo estimate signal y[n].

14. An improved NLP as in claim 13, wherein said means for controlling said NLP threshold includes means for measuring the energy of the echo estimate signal y[n] and for controlling said NLP threshold to have a level that is a function of the echo estimate signal y[n] energy level.

15. An improved method of operating a nonlinear processor (NLP) connected to an echo canceller that couples to first and second paths of a telecommunications network and generates a signal y[n] that is an estimate of an echo signal that occurs on the first path in response to a signal on the second path and that is subtracted from a signal on the first path to leave on the first path a residual signal e[n], wherein the NLP has an NLP threshold and couples to the first path to receive the residual signal e[n] at an input thereto and to generate at an output therefrom and on the first path a send out signal $e_{out}[n]$ that is related to the residual e[n] by a threshold transfer function of the NLP, and wherein the improvement is characterized by the steps of controlling the NLP threshold to be a function of the echo estimate signal y[n], so that the threshold transfer function also is a function of the echo estimate signal y[n]; providing the NLP with a noise transparency (NT) threshold; controlling the NT threshold to be a function of a background noise signal portion of the first path signal on the input side of the NLP; and generating on the first path, on the output side of the NLP, a signal that is in accordance with the residual signal e[n] levels that are below the NT threshold and in which the spectral content of such residual signal levels is generally maintained, the NT threshold being lower than the NLP threshold.

16. An improved method as in claim 15, wherein said controlling step comprises measuring the energy level of the echo estimate signal y[n], and controlling the NLP threshold to have a level that is a function of the echo estimate signal y[n] energy level.

17. An improved method as in claim 15, wherein said controlling step comprises measuring the energy level of the echo estimate signal y[n], adding a selected energy level to the measured energy level of the echo estimate signal y[n], and controlling the NLP threshold to have a level that is a function of the sum of the two energy levels.

18. An improved method as in claim 15, wherein the threshold transfer function is such that $e_{out}[n] = 0$ for $e[n] < NLP$ threshold and $e_{out}[n] = e[n] - NLP$ threshold for $e[n] \geq NLP$ threshold.

19. An improved method as in claim 15, wherein said generating step comprising controlling the NLP to be essentially transparent to residual signal e[n] levels that are below the NT threshold, so that such residual signal levels appearing on the first path at the NLP input are presented, generally without change in the spectral content thereof, at said NLP output.

20. An improved method as in claim 19, wherein said step of controlling the NT threshold comprises estimating the level of a background noise signal portion of the residual signal e[n], and controlling the NT threshold to have a level in accordance with the estimated level of the background noise signal portion.

21. An improved method as in claim 15, wherein the threshold transfer function of the NLP also is in accordance with the NT threshold and the threshold transfer function is defined by $e_{out}[n] = e[n]$ for $e[n] < NT$ threshold $e_{out}[n] = NT$ threshold for $NT$ threshold $< e[n] < NLP$ threshold $+ NT$ threshold and $e_{out}[n] = e[n] - NLP$ threshold for $e[n] \geq NLP$ threshold $+ NT$ threshold.

22. An improved method of operating a nonlinear processor (NLP) connected to an echo canceller that couples to first and second paths of a telecommunications network and generates a signal y[n] that is an estimate of an echo signal that occurs on the first path in response to a signal on the second path and that is subtracted from a signal on the first path to leave on the first path a residual signal e[n], wherein the NLP has an NLP threshold and couples to the first path to receive the residual signal e[n] at an input thereto and to generate at an output therefrom and on the first path a send out signal $e_{out}[n]$ that is related to the residual signal e[n] by a threshold transfer function of the NLP, wherein the improvement is characterized by the steps of providing the NLP with a noise transparency (NT) threshold; controlling the NT threshold to be a function of a background noise signal portion of the first path signal on the input side of the NLP; and generating on the first path, on the output side of the NLP, a signal in accordance with the residual signal e[n] levels that are below the NT threshold and in which the spectral content of such residual signal levels is generally maintained, the NT threshold being lower than the NLP threshold.

23. An improved method as in claim 22, wherein said generating step comprises controlling the NLP to be essentially transparent to residual signal e[n] levels that are below the NT threshold, so that such residual signal levels appearing at the NLP input are presented, generally without change in the spectral content thereof, at the NLP output.

24. An improved method as in claim 22, wherein the threshold transfer function of the NLP also is in accordance with the NT threshold and the send out signal $e_{out}[n]$ is related to the residual signal e[n] by a first transfer function for residual signal e[n] levels that are below the NT threshold, by a second transfer function for residual signal e[n] levels that are equal to or greater than the NT threshold and less than the NLP threshold plus the NT threshold, and by a third transfer function for residual signal e[n] levels that are equal to or greater than the NLP threshold plus the NT threshold.

25. An improved method as in claim 24, wherein said first, second and third transfer functions are defined by $e_{out}[n] = e[n]$ for $e[n] < NT$ threshold $e_{out}[n] = NT$ threshold for $NT$ threshold $\leq e[n] < NLP$ threshold $+ NT$ threshold and $e_{out}[n] = e[n] - NLP$ threshold for $e[n] \geq NLP$ threshold $+ NT$ threshold.

26. An improved method as in claim 22, wherein said step of controlling the NT threshold comprises estimating the level of a background noise signal portion of the residual signal e[n], and controlling the NT threshold to have a level in accordance with the estimated level of the background noise signal portion.

27. An improved method as in claim 22, including the further step of controlling the NLP threshold to have a level that is a function of the echo estimate signal y[n].

28. An improved method as in claim 27, wherein said step of controlling the NLP threshold level comprises measuring the energy level of the echo estimate signal y[n], and controlling said NLP threshold to have a level that is a function of the echo estimate signal y[n] energy level.

29. An improved nonlinear processor (NLP) connected to an echo cancellar that couples to first and second paths of a telecommunications network and generates a signal y[n] that is an estimate of an echo signal that occurs on the first path in response to a signal on the second path and that is substracted from a signal on the first path to leave on the first path a residual signal e[n], wherein said NLP has an NLP threshold and couples to the first path to receive the residual signal e[n] at an input thereto and to generate at an output therefrom and on the first path a send out signal $e_{out}[n]$ that is related to the residual signal e[n] by a threshold transfer function of said NLP, and wherein the improvement is characterized by means for controlling said NLP threshold to be a function of the echo estimate signal y[n]; means for providing said NLP with a noise transparency (NT) threshold and for controlling said NT threshold to be a function of a background noise signal portion of the first path signal on the input side of said NLP; and means for controlling said threshold transfer function of said NLP such that, when said NT threshold is lower than said NLP threshold, said NLP generates at its output a signal $e_{out}[n]$ in accordance with residual signal e[n] levels at its input that are below said NT threshold and above said NLP threshold and such that, when said NT threshold is above than said NLP threshold, said NLP threshold is brought to a low level and said NLP generates at its output a signal $e_{out}[n]$ in accordance with residual signal e[n] levels that are above said NLP threshold.

30. An improved method of operating a nonlinear processor (NLP) connected to an echo canceller that couples to first and second paths of a telecommunications network and generates a signal y[n] that is an estimate of an echo signal that occurs on the first path in response to a signal on the second path and that is subtracted from a signal on the first path to leave on the first path a residual signal e[n], wherein the NLP has an NLP threshold and couples to the first path to receive the residual signal e[n] at an input thereto and to generate at an output therefrom and on the first path a send out signal $e_{out}[n]$ that is related to the residual signal e[n] by a threshold transfer function of the NLP, and wherein the improvement is characterized by the steps of controlling the NLP threshold to be a function of the echo estimate signal y[n]; providing the NLP with a noise transparency (NT) threshold that is a function of a background noise signal portion of the first path signal on the input side of the NLP; and controlling the threshold transfer function of the NLP such that, when the NT threshold is lower than the NLP threshold, the NLP generates at its output a signal $e_{out}[n]$ in accordance with residual signal e[n] levels at its input that are below the NT threshold and above the NLP threshold and such that, when the NT threshold is above the NLP threshold, the NLP threshold is brought to a low level and the NLP generates at its output a signal $e_{out}[n]$ in accordance with residual signal e[n] levels that are above the NLP threshold.

* * * * *